United States Patent
Faerber

(10) Patent No.: US 6,544,447 B1
(45) Date of Patent: Apr. 8, 2003

(54) METHOD OF PAPER SLUDGE AND PLASTICS FORMULATION

(76) Inventor: Thomas C. Faerber, 16460-90th Ave., Chippewa Falls, WI (US) 54729

( * ) Notice: Subject to any disclaimer, the term of this patent is extended or adjusted under 35 U.S.C. 154(b) by 0 days.

(21) Appl. No.: 09/538,045

(22) Filed: Mar. 29, 2000

Related U.S. Application Data

(60) Provisional application No. 60/128,133, filed on Apr. 7, 1999.

(51) Int. Cl.$^7$ ............................................. B29C 47/00
(52) U.S. Cl. .............................. 264/37.26; 264/37.29; 264/143; 264/211
(58) Field of Search .................................. 264/143, 180, 264/211, 142, 141, 916, 914, 918, 920, 37.18, 37.26, 37.28, 37.29

(56) References Cited

U.S. PATENT DOCUMENTS

| | | | | |
|---|---|---|---|---|
| 4,560,527 A | * | 12/1985 | Harke et al. ................. | 119/172 |
| 5,474,435 A | * | 12/1995 | Hunke ......................... | 264/143 |
| 5,582,682 A | * | 12/1996 | Ferretti ....................... | 156/62.2 |
| 5,770,138 A | * | 6/1998 | Yoder .......................... | 119/172 |
| 5,795,377 A | * | 8/1998 | Tanner et al. ............. | 106/164.4 |
| 5,997,784 A | * | 12/1999 | Karnoski ..................... | 264/101 |
| 6,039,905 A | * | 3/2000 | Zollitsch et al. ............ | 264/143 |

OTHER PUBLICATIONS

Injection Molding Equipment.
Vented Cylinder and Two–Stage Feed Screw.
312E Sludge and High–Strength Waste Formula.
Dolco Packaging Corporation Material Safety Data Sheet.

* cited by examiner

Primary Examiner—Mark Eashoo
(74) Attorney, Agent, or Firm—Vidas, Arrett & Steinkraus, P.A.

(57) ABSTRACT

This invention generally relates to the formulation of thermoplastic pellets from a combination of raw sludge material from a paper mill with thermoplastic material from post industrial or consumer sources. Initially, waste raw sludge material is transported via a conveyor to a dryer for removal of excess water. The waste thermoplastic material is preferably shredded into a desired size and transported to a densifier. The dried sludge is added to the densifier where the shredded thermoplastic material and dried sludge is suitably mixed with additive agents. The mixed sludge and shredded thermoplastic material is then transported to a grinder for grinding. The ground material is then transported to a hopper for introduction into an extruder. The ground combined material is then subjected to an extrusion process for the formulation of thermoplastic pellets having supplemental fibers to enhance the properties for use as starting material in an injection molding process.

18 Claims, 1 Drawing Sheet

METHOD OF PAPER SLUDGE AND PLASTICS FORMULATION

CROSS-REFERENCE TO RELATED APPLICATIONS

This application is a Utility Application claiming priority to Provisional Application No. 60/128,133 filed Apr. 7, 1999 the entire contents of which is hereby incorporated by reference.

STATEMENT REGARDING FEDERALLY SPONSORED RESEARCH

Not Applicable

BACKGROUND OF THE INVENTION

In the past a need has existed to use waste products particularly in the thermoplastic industry for recycling into other products. These waste materials may originate from post-industrial or post-consumer sources. Recycling of thermoplastic material has been deterred due to economic considerations for processing of the waste materials into other products. Generally, waste thermoplastic materials require grinding and then extrusion into pellets for further use in an injection molding process.

In the extrusion molding process for formulation of plastic pellets, the raw material requires a sufficient resiliency to enable handling of the heated or hot materials as exiting from a die. These heated or hot raw materials may then be cooled in a water bath prior to cutting or pelletizing. The pelletized thermoplastic may then be used as starting material in an injection molding process. In an injection molding process the thermoplastic material is generally formed of polypropylene, high density polyethylene, or nylon where these materials provide a desired level of flow into a mold. The goal of the injection molding process is to form other products or component parts from the starting raw thermoplastic material. The selection of thermoplastic material in the extrusion process may have different characteristics for optimal performance as compared to an injection molding process. In the extrusion process, lubrication of the raw material for heating and feeding through the flights is of primary importance.

In the past, a need has existed for introduction of filler material to supplement raw thermoplastic waste for further processing where the filler material is used as starting material for an extrusion process to formulate thermoplastic pellets. It has not been previously known to use waste sludge from a paper mill as a source of supplementary fibers for combination with raw waste thermoplastic material for formulation of thermoplastic pellets for use in an injection molding process. A problem with the use of waste sludge from a paper mill has been the existence of an undesirable odor, excess water, and a lack of adequate lubrication.

A prerequisite to the use of waste sludge from a paper mill is to reduce the water content of the raw sludge by drying. Preferably the water content is reduced to approximately 1 percent or less. It is also desirable to use thermoplastics having relatively low melting temperatures to avoid exposure of excess heat to the sludge fibers which may result in the weakening of the strands to be used in the extrusion process.

The use of waste sludge from a paper mill in combination with waste thermoplastic material in an extrusion process yields cost effective thermoplastic pellets for further use as starting material in an injection molding process.

BRIEF SUMMARY OF THE INVENTION

This invention generally relates to the formulation of thermoplastic pellets from a combination of raw sludge material from a paper mill with waste thermoplastic material from post industrial or consumer sources. Initially, waste raw sludge material is treated with a masking chemical and then transported via a conveyor to a dryer for removal of excess water. The sludge material may be additionally treated with a masking chemical at selected times throughout the formulation process. The waste thermoplastic material and the dried sludge material may then be added to a densifier where they are shredded and combined. Preferably, it is desirable to add a predetermined quantity of saw dust to the mixture of dried sludge and waste plastic. A masking chemical and lubricant may also be added to the combined waste plastic and dried sludge in the densifier. The mixture may then be transported to a grinder for grinding. The ground material may then transported to a hopper for introduction into an extruder. The ground combined material may then be subjected to an extrusion process for the formulation of thermoplastic pellets having supplemental fibers to enhance the properties for use as starting material in an injection molding process.

A principal advantage of the present invention is the provision of a formulated process for manufacture of thermoplastic pellets of relatively simple and inexpensive design, construction, and operation which is safe and which fulfills the intended purpose of providing cost-effective thermoplastic pellets for use as starting material in an injection molding process without fear of injury to individuals and/or damage to property.

Another principal advantage of the present invention is the provision of a formulation process for manufacture of thermoplastic pellets which utilizes waste raw thermoplastic material from post-industrial and/or post-consumer sources for recycling into starting material for an injection molding process.

Still another principal advantage of the present invention is the provision of a formulation process for manufacture of thermoplastic pellets which utilizes waste raw sludge material from a paper mill as a source of supplementary fibers for incorporation into thermoplastic pellets for use as starting material in an injection molding process.

Still another advantage of the present invention is the provision of a formulation process for manufacture of thermoplastic pellets which has desired fiber properties for use in an injection molding process.

Still another advantage of the principal invention is the provision of a formulation process for manufacture of thermoplastic pellets which has desired melting parameters for use in an extrusion process.

Still another advantage of the present invention is the provision of a formulation process for manufacture of thermoplastic pellets which removes any undesirable odor from the sludge material.

Still another advantage of the present invention is the provision of a formulation process for manufacture of thermoplastic pellets which has desired properties for the pellets for flow of material into a mold in an injunction molding process.

Still another advantage of the present invention is the provision of a formulation process for manufacture of thermoplastic pellets having desired lubrication properties for the material for heating and feeding through the flights of an extruder for pellet formulation.

Still another advantage of the present invention is the provision of a formulation process for the manufacture of thermoplastic pellets having a desired reduced water level for the raw sludge material for combination with recycled thermoplastic material for extrusion into thermoplastic pellets.

Another feature of the present invention is the provision of a formulation process for manufacture of thermoplastic pellets where the dried sludge and thermoplastic material are shredded and combined in a densifier with additive agents.

Another feature of the present invention is the provision of a formulation process for manufacture of thermoplastic pellets where the mixed and densified dry sludge and shredded thermoplastic material are ground into a composite material.

Still another feature of the present invention is the provision of a formulation process for manufacture of thermoplastic pellets where the ground composite material is placed into a hopper as coupled to an extruder.

Still another feature of the present invention is the provision of a formulation process for manufacture of thermoplastic pellets where the composite material is heated and compressed in an extrusion process for cooling and cutting into thermoplastic pellets for use in an injection molding process.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

Figure 1:
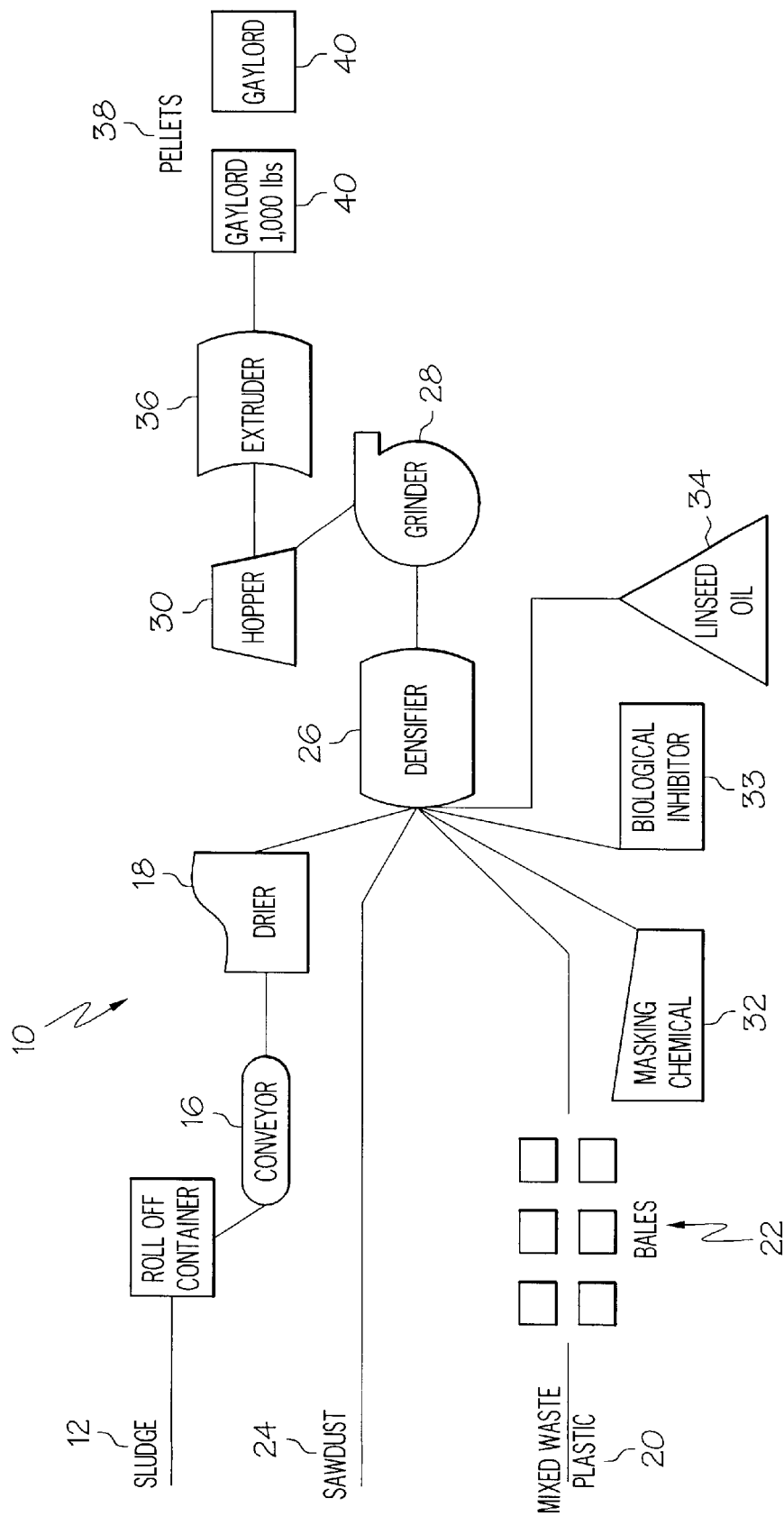
FIG. 1 is a block diagram illustrating the steps of the inventive process.

The formulation process for manufacture of thermoplastic pellets is illustrated and described herein. The formulation process for manufacture of thermoplastic pellets may be seen in FIG. 1 which is generally indicated by the numeral 10. The formulation process for manufacture of thermoplastic pellets 10 preferably initiates with the acquisition of raw sludge material 12 which is preferably acquired as a waste product from a paper mill supplier. The raw sludge material 12 preferably comprises anywhere from 10 to 50 percent of the total weight of the finished thermoplastic pellets 14.

The inventive process described herein will allow for the production of thermoplastic pellets 38 which are formed of mixed waste plastic material made up of polystyrene foam and polypropylene. The thermoplastic pellets 38 are comprised of between 35 to 45 percent polystyrene foam, and preferably 40 percent. Polypropylene forms between 21 to 31 percent of the thermoplastic pellets 38 and more preferably makes up 26% of the total weight of the pellets 38.

As previously indicated the thermoplastic pellets 38 are also formed of dried sludge having a percentage by weight between 15 to 25 percent, preferably a percentage weight of 20 percent.

The thermoplastic pellets 38 are also formed of saw dust, indicated by reference numeral 24 and having a percentage by weight of between 5 and 15 percent, a preferred percentage weight of 10 percent.

The thermoplastic pellets 38 are also formed of 0 to 3 percentage by weight of a lubricant 34, preferably 2 percent. In the most preferred embodiment the lubricant 34 is linseed oil.

A biological inhibitor, indicated by reference numeral 33, may be added to the composition of the thermoplastic pellets 38. In the preferred embodiment of the invention the biological inhibitor 33 is diodemthyl-p-tolylsulfone which comprises between 0 to 1 percent by weight of the thermoplastic pellets 38, preferably 0.5 percent of the total weight of the pellets 38.

Finally, a masking chemical may comprise between 0 and 1 percentage by weight of the thermoplastic pellets 38, preferably 0.5%. The percentage amount of masking chemical will vary depending on the quantity and the number of times it is applied through out the inventive process.

Raw sludge material from paper mills may have a wide range of components. In the present invention it is preferable that, the raw sludge 12 be comprised generally of total solids having a percentage weight between 32% and 35.5% having an average percentage weight of 34.55%. The raw sludge material 12 is also formed of nitrogen having a percentage average weight of 0.643% and a percentage range between 0.57% and 0.73%. The raw sludge material 12 is also formed of ammonium N having an average percentage weight of 0.057% and a range between 0.034% and 0.07%. The raw sludge material 12 also includes phosphorous having an average percent weight of 0.150% and a range between 0.13% and 0.17%. The raw sludge material 12 also includes potassium having an average percent weight of 0.045% and a range between zero and 0.08%. The pH for the raw sludge material 12 preferably on average is 7.627 and includes a pH range between 7.61 and 7.72.

As may be seen in Table A, the raw sludge material 12 also preferably includes chemicals identified in milligrams per kilogram. On average, the raw sludge material 12 includes 221.333 milligrams of sodium; 2.309 milligrams of arsenic; 27.4 milligrams of copper; 5.01 milligrams of nickel; 59.3 milligrams of zinc; 6.535 milligrams of chromium; 93,633.333 milligrams of calcium; 1,556.667 milligrams of magnesium; 11 nanograms of 2378-TCDF; 2.3 nanograms of 2378-TCDD; and 3.4 nanograms of total dioxin equivalents.

In general, the raw sludge material 12 may arrive for processing in roll-offs of approximately 15,000 pounds each. The roll-offs of raw sludge material 12 are preferably transported via a conveyor 16 to the dryer 18. The dryer temperature is approximately 200° F. The raw sludge material 12 preferably arrives for processing having a moisture content of up to approximately 50 percent. Exposure to the dryer 18 reduces the moisture content of the raw sludge material to 12 to 5 percent or less and preferably 1 percent or less.

The formulation process for the manufacture of thermoplastic pellets also includes the use of raw or mixed waste plastic materials 20. The raw or mixed waste plastic materials 20 are preferably obtained from post-industrial and/or post-consumer sources. The raw or mixed waste plastic materials 20 preferably arrive for processing in bails 22. The raw or mixed waste plastic materials 20 may be formed of post-industrial waste polystyrene foam roll stocks and also polystyrene foam manufactured by Dolco Packaging.

It should be noted that other raw or mixed waste plastic materials 20 may be utilized in the formulation process for manufacture of thermoplastic pellets 10. Other examples of raw or mixed waste plastic materials 20 would include polypropylene, high density polyethylene, and/or nylon. The use of a variety of raw or mixed waste plastic materials 20 is to satisfy the needs of the injection molding process for plastics having or providing good flow of the material into a mold. A critical need for the extrusion process is for the melting strength or resiliency of the raw or mixed waste plastic materials 20 to enable handling of hot materials as the heated materials exit from a die into a cooling water bath prior to pelletizing.

Operational parameters for the formulation process for manufacture of thermoplastic pellets are somewhat limited by the heat to be exposed to the sludge 12 and/or raw or mixed waste plastic materials 20. Temperatures exceeding 400° F. to 425° F. frequently produce odor, discoloration, and/or a weakening of the fibers in the sludge 12 which the formulation process for manufacture of thermoplastic pellets 10 is attempting to use advantageously for combination with the raw or mixed waste plastic materials 20. In addition, the strand quality when temperatures exceed 425° F. tends to degrade prior to pelletizing. Therefore, both styrene, polyethylene and polypropylene are effective raw or mixed plastic materials 20 due to the low melting temperatures for these plastics.

The raw or mixed waste plastic materials 20 preferably may be utilized from any available color or variety of material. The raw or mixed waste plastic materials 20 preferably have a melting point of approximately 320° F. or 104° C.

More detailed specifications concerning the raw or mixed waste plastic materials 20 may be obtained by reference to attached Tables B and C which are incorporated by reference herein.

The bails 22 of raw or mixed waste plastic materials 20 are preferably transported to the densifier 26 for processing. An initial function of the densifier 26 is to shred the raw or mixed waste plastic materials 20.

The raw sludge 12 as dried in the dryer 18 may also be transported to the densifier 26 for shredding and mixing of approximately four parts dried sludge 12 to two parts waste plastic material 20 and one part saw dust 24.

Three additives may be mixed with the dried raw sludge material 12, mixed waste plastic materials 20 and saw dust 24 in the densifier 26. The three additives may be the masking chemical 32, a biological inhibitor 33, and a lubricant 34. The masking chemical 32 preferably masks the odor of the sludge 12 and the lubricant 34 preferably assists in providing lubrication to the extrusion and injection molding processes.

The masking chemical 32 may preferably be Brand Odor Countervailant™ 312E Formula which is a compound to address the highly complex malodors associated with biological decomposition of sludges and high-strength liquid waste. Sludges and highstrength liquid waste have a high biochemical oxygen demand (BOD). The high biochemical oxygen demand (BOD) establishes a reaction environment where it is impractical and/or impossible to maintain free or chemically uncombined oxygen (DO) in the solutions.

Consequently, the biological process is almost always anaerobic. Anaerobic bacteria must obtain oxygen by chemically breaking down organic compounds which contain combined oxygen. This reductive process produces malodorous by-products. The malodorous byproducts are frequently a nuisance and may be quite pungent depending upon the underlying chemical reactions.

A common malodorous by-product is the rotten egg smell of hydrogen sulfide ($H_2S$) and/or the stinging odor of ammonia ($NH_3$). Other sulfides, mercaptans, amines, indole and skatole compounds are also common. In addition to available macro organic substrates, many other factors influence the types and amounts of the malodors produced including but not limited to pH, temperature, retention time, inorganic ions, trace elements, vitamins, iron-chelating compounds, amino acids, unsaturated fatty acids, nucleic acid bases, exoenzymes, and other chemicals.

Complex reaction conditions are frequently too vigorous to effectively use chemical oxidants and metallic salts for reduction of malodors. Frequently, chemical oxidants and metallic salts reduce only a portion of the spectrum of malodors under narrow operating conditions. Biocides are environmentally unsound as odor control agents, because these chemicals frequently stop the necessary reductive process. Masking agents and counteractants may also be overwhelmed by the malodorous by-products.

The Brand Odor Countervailant™ 312E Formula functions well in reduction of malodors associated with the malodorous by-products during use in sludges and high-strength waste. The masking chemical 32 preferably functions effectively in all field ranges of temperature and pH rendering the masking chemical 32 extremely flexible for enhancement of the reduction of malodors in the formulated process for manufacture of thermoplastic pellets 10. Further information concerning the reaction parameters for the masking chemical 32 are identified on the attached Table D which is incorporated by reference herein. It should be noted that the use of the masking chemical 32 may be introduced periodically to act as a countervailant for a non-constant level of malodor within a reaction vessel.

Due to the malodorous nature of the raw sludge material 12, the sludge is preferably treated with masking chemical 32 prior to, as well as subsequent to, exposure to the dryer 18. Additionally, the thermoplastic pellets 38 may be treated with masking chemical 32.

The removal of moisture in the initial process of drying the raw sludge 12 is critical to the formulation process for manufacture of thermoplastic pellets 38. As previously indicated, the dryer 18 preferably reduces moisture from the raw sludge 12. A failure to reduce moisture from the raw sludge 12 has the effect of creating steam and further causes the strands in the extrusion process to swell. Swelling may cause an inconsistent size of a pellet to be formed. Pellets are required to be consistent size to be commercially acceptable.

The composite mixture of dried sludge 12, mixed waste plastic materials 20, saw dust 24 and other additives including: lubricant 34, inhibitor 33 and masking chemical 32 10 may then be transported to a grinder 28. It should be noted that a conveyor mechanism may be used to transport the materials from the densifier 26 to the grinder 28 at the preference of an individual.

In the grinder 28 the composite mixture may be processed for grinding into any desired size as preferred by an individual. The ground mixed materials may then be transported to a hopper 30. It should be noted that a conveyor may transport the ground materials from the grinder 28 to the hopper 30 at the preference of an individual.

The hopper 30 preferably contains approximately 1,000 pounds of ground material for processing.

The hopper 30 is preferably coupled to an extruder 36 which permits feeding of the ground and mixed sludge 12, plastic 20, saw dust 24, masking chemical 32, inhibitor 33 and lubricant 34 composition for exposure to an extruding process. The ground material is exposed to a standard extrusion process. The extruder 36 preferably includes a vented cylinder and a two-stage feed screw such as is known to those of ordinary skill in the art. The ground material is initially fed into the extruder 36 for engagement to a screw. The screw moves the material from a feed zone into a compression zone and then into a metering zone then into a venting zone and further into a second compression zone, and lastly into a second metering zone. During this movement of material, the material melts from a predominantly solid configuration for compaction to a melt film formulation, and then to a melted pool formation for further melting where melting is complete in a second stage proximate to die. As the melted material exits the extruder, the die forms the material in a predominantly strand shape. As the strand exits the die, the strand travels down a trough which is preferably approximately ten (10) feet in length and is filled with cooled water. The strand following exit from the cooled water bath enters a cutter which cuts the strands into 1/16 inch pieces which are identified as pellets 38. The pellets 38 may then be blown into a gaylord 40. A gaylord is a container having approximate dimensions of 3 feet in width, 3 feet in length, and 3 feet in height which is used to transport the pellets 38. Typically a gaylord 40 holds approximately 1,000 pounds of pellets 38. The temperature range for the extrusion process is approximately 300° to 450° F. dependent on the type of plastic utilized.

The extrusion process described above is one of the many types of extrusion processes which would be suitable for use in the present inventive process. One of ordinary skill in the art will recognize that many alternative extruders and extrusion processes may be utilized to produce pellets 38 as may be desired. Information concerning the extruder 36 and the extrusion process described above is attached hereto and incorporated by reference as Exhibit F.

The pellets 38 may then be used in an injection molding process for the formulation of other parts or products at the discretion of an individual. The pellets 38 as formed from the formulation process for manufacture of thermoplastic pellets 10 preferably include binding strands as originally provided from the sludge 12 which provide enhanced properties as related to strength, durability, and use in the formation of other products.

It should be noted that the use of the masking chemical 32; a biological inhibitor, preferably diodemthyl-p-tolylsulfone 33; a lubricant 34, preferably linseed oil, enhance the formulation of the pellets 38 and provide for additional desirable properties to assist in maximization of utility of the pellets 38 as introduced into an injection molding process. An injection molding process is described in further detail in Exhibit G which is attached hereto and incorporated by reference herein.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A method of formulating thermoplastic pellets for use in an injection molding process comprising the following steps:
    (a) obtaining an amount of a raw sludge material, the amount of raw sludge material including a percentage of water;
    (b) removing at least a portion of the water by exposing the raw sludge material to a dryer, thereby resulting in an amount of dried sludge material;
    (c) obtaining an amount of plastic material;
    (d) obtaining an amount of saw dust;
    (e) a shredding step, the shredding step comprising shredding the amount of dried sludge material and the plastic material;
    (f) a blending step, the blending step blending the amount of dried sludge material and the plastic material together with the saw dust to form a quantity of composite material;
    (g) placing the quantity of composite material into a grinder to form a ground composite material;
    (h) placing a quantity of the ground composite material into an extruder, thereby forming a stand; and
    (i) feeding the strand into a pelletizer to form pellets.

2. The method of claim 1 wherein steps (e) through (i) are sequential.

3. The method of claim 1 wherein the shredding step and the blending step take place in a densifier.

4. The method of claim 1 further comprising the step of placing the pellets into a container.

5. The method of claim 1, the blending step further comprising:
    adding a quantity of masking chemical.

6. The method of claim 1, the blending step further comprising:
    adding a quantity of lubricant.

7. The method of claim 6, wherein the lubricant is linseed oil.

8. The method of claim 1, the blending step further comprising:
    adding a quantity of biological inhibitor.

9. The method of claim 8, wherein the biological inhibitor is diodemthyl-p-tolylsulfone.

10. The method of claim 1, the plastic material comprising polystyrene foam and polypropylene.

11. The method of claim 1 wherein the extruder includes a hopper, step (h) further comprising placing a quantity of the ground composite material into the hopper, the quantity of the ground composite material flowing from the hopper into the extruder at a controlled rate.

12. A method of formulating thermoplastic pellets for use in injection molding processes comprising:
    (a) obtaining raw sludge material;
    (b) drying the raw sludge material, thereby obtaining dried sludge material;
    (c) obtaining plastic material;
    (d) obtaining saw dust;
    (e) placing the plastic material, saw dust and dried sludge material into a densifier, the densifier forming a composite material of shredded plastic material, saw dust and dried sludge material;
    (f) grinding the composite material into a ground composite material;
    (g) feeding a quantity of composite material into an extruder;
    (h) extruding the quantity of composite material, thereby forming at least one composite strand; and
    (i) placing the at least one composite strand into a pelletizer to form thermoplastic pellets.

13. The method of claim 12 wherein step (e) further comprises:
    adding a quantity of masking chemical.

14. The method of claim 13 wherein step (e) further comprises:
    adding a quantity of lubricant.

15. The method of claim 14 wherein the lubricant is linseed oil.

16. The method of claim 14 wherein step (e) further comprises:
    adding a quantity of biological inhibitor.

17. The method of claim 16 wherein the biological inhibitor is diodemthyl-p-tolylsulfone.

18. The method of claim 16, the plastic material comprising polystyrene foam and polypropylene.

* * * * *